(12) United States Patent
Duggal et al.

(10) Patent No.: US 8,285,637 B2
(45) Date of Patent: Oct. 9, 2012

(54) AUTHORIZATION REQUEST FOR FINANCIAL TRANSACTIONS

(75) Inventors: Chanderpreet Singh Duggal, Phoenix, AZ (US); Kristin R. Hoyne Gomes, Fenton, MO (US); Peter Georger Harris, Scottsdale, AZ (US); Meghan Mary Paciorek Kroneman, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 121 days.

(21) Appl. No.: 12/416,675

(22) Filed: Apr. 1, 2009

(65) Prior Publication Data

US 2010/0257068 A1    Oct. 7, 2010

(51) Int. Cl.
*G06Q 40/00*    (2012.01)
(52) U.S. Cl. ............... 705/38; 705/39; 705/41; 705/75
(58) Field of Classification Search .............. 705/75, 705/38, 39, 41
See application file for complete search history.

(56) References Cited

U.S. PATENT DOCUMENTS

| | | | | |
|---|---|---|---|---|
| 5,913,202 A | * | 6/1999 | Motoyama | 705/36 R |
| 7,904,332 B1 | * | 3/2011 | Merkley et al. | 705/14.1 |
| 2005/0108178 A1 | * | 5/2005 | York | 705/75 |
| 2006/0026076 A1 | * | 2/2006 | Raymond | 705/26 |
| 2006/0212387 A1 | * | 9/2006 | Jensen | 705/39 |
| 2009/0313134 A1 | * | 12/2009 | Faith et al. | 705/26 |
| 2010/0100484 A1 | * | 4/2010 | Nguyen et al. | 705/44 |

\* cited by examiner

*Primary Examiner* — Charles C Agwumezie
(74) *Attorney, Agent, or Firm* — Snell & Wilmer L.L.P.

(57) ABSTRACT

Embodiments of the present invention provide a method, system, and computer program product for authorizing a financial transaction. A financial institution can identify financial risk associated with the financial transaction based on product details. The product details are sent to the financial institution by a merchant along with the authorization request. The financial institution, then, notifies the merchant regarding authorization of the financial transaction based on the risk assessment. Finally, the merchant fulfills or terminates the financial transaction based on the notification received regarding authorization request.

14 Claims, 5 Drawing Sheets

| Product Type | Product Make | Product Code | Priority Order |
|---|---|---|---|
| Mobile Phone | Samsung– D900i | P1 | 1 |
| LCD TV | Sony – HDTV 423 | P2 | 2 |
| Electronic Gift | Casio-7324 | P3 | 3 |
| PDA | Seimens-772 | P4 | 4 |
| Laptop | Toshiba – Series 10a | P5 | 5 |
| Digital Camera | Sony - CyberShot 700a | P6 | 6 |

AUTHORIZATION REQUEST FOR FINANCIAL TRANSACTIONS

BACKGROUND

1. Field

Embodiments of the present invention generally relate to authorization of financial transactions, particularly to authorization of financial transactions based on financial risk involved in purchase orders.

2. Background Art

Financial transactions that use debit cards, credit cards, and other similar cashless methods for purchasing products are increasingly becoming popular. In a cashless financial transaction, a consumer needs to provide his or her card details or any other transaction-related details to a merchant while placing the purchase order. The merchant sends these details in the form of an authorization request to a financial institution for seeking authorization of the financial transaction. Thereafter, the financial institution decides whether to authorize the merchant to carry out the financial transaction or not, and transmits the decision to the merchant for execution.

The financial institution makes an authorization decision after assessing financial risk involved in the financial transaction. The authorization decision is based on the transaction-related details and other risk assessment parameters. These risk assessment parameters generally include consumer track record, consumer history, consumer profile, and the like. Typically, the merchant sends the transaction-related details, such as name of the cardholder, card number, card security number, expiry date of the card, and a merchant identifier, in the authorization request. Based on the transaction-related details, the financial institution verifies the authenticity of the card use and assesses the financial risk involved in the financial transaction.

It has been observed while assessing fraud cases and risk involved in the financial transactions that certain product ranges have a higher probability of fraud risk as compared with other product categories. However, existing methods of risk assessment and authorization of merchants do not include identification of product features.

In light of the foregoing, there is a need for a method and system for assessing financial risk involved in financial transactions before authorizing a merchant to execute the financial transaction. Further, the method and system should be capable of identifying product features during risk assessment.

BRIEF SUMMARY

A method, system, and computer program product are provided for authorizing a merchant for completing a financial transaction. In accordance with embodiments of the invention, authorization of the financial transaction may be performed. In particular, authorization of the financial transaction based on risk associated with specified products can be performed in real time, at the same time the standard transaction authorization is performed. Additionally, authorization of the financial transaction based on the quantity of the products being purchased can be performed.

Embodiments of the invention include a method, system, and a computer program product for authorizing a merchant for completing a financial transaction. In an embodiment, cashless methods for carrying out financial transactions based on a predefined list of products are implemented. The predefined list of products may include products that are considered high-risk products by the financial institution and is provided to the merchants.

In an embodiment, when a consumer places a purchase order with the merchant, the merchant identifies a product from the purchase order that may involve high risk. The product is identified on the basis of a predefined list of products and the quantity of the product being purchased. The merchant sends the details associated with the identified product to the financial institution along with an authorization request for seeking authorization.

The financial institution receives the product details along with the authorization request and assesses risk involved in the financial transaction. Thereafter, the financial institution makes a decision based on the risk assessed and sends a notification to the merchant. The merchant accordingly completes or rejects the purchase order based on the notification.

An embodiment of the present invention includes a computer program product. The computer program product instructs the system to receive and process the product details and transmits the notification regarding authorization of the financial transaction to the merchant.

BRIEF DESCRIPTION OF THE DRAWINGS/FIGURES

The features and advantages of the present invention will become more apparent from the detailed description set forth below, when taken in conjunction with the drawings, in which like reference numbers indicate identical or functionally similar elements. Additionally, the left-most digit of a reference number identifies the drawing in which the reference number first appears.

FIG. 4 is a block diagram of an exemplary predefined list of products, in accordance with an embodiment of the present invention.

DETAILED DESCRIPTION

I. Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an exemplary embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

Embodiments of the present invention provide a method, system, and computer program product for seeking an authorization of a financial transaction. Embodiments of the present invention enable a financial institution to identify risk associated with the financial transaction based on products involved in the financial transaction in real time. Details related to the products are sent to the financial institution by a merchant along with an authorization request. The financial institution identifies financial risk associated with the financial transaction based on the product details, and accordingly decides whether to authorize the merchant for carrying out the financial transaction or not. Thereafter, the financial institution notifies the merchant regarding the decision about the authorization of the financial transaction.

II. System

Figure 1:
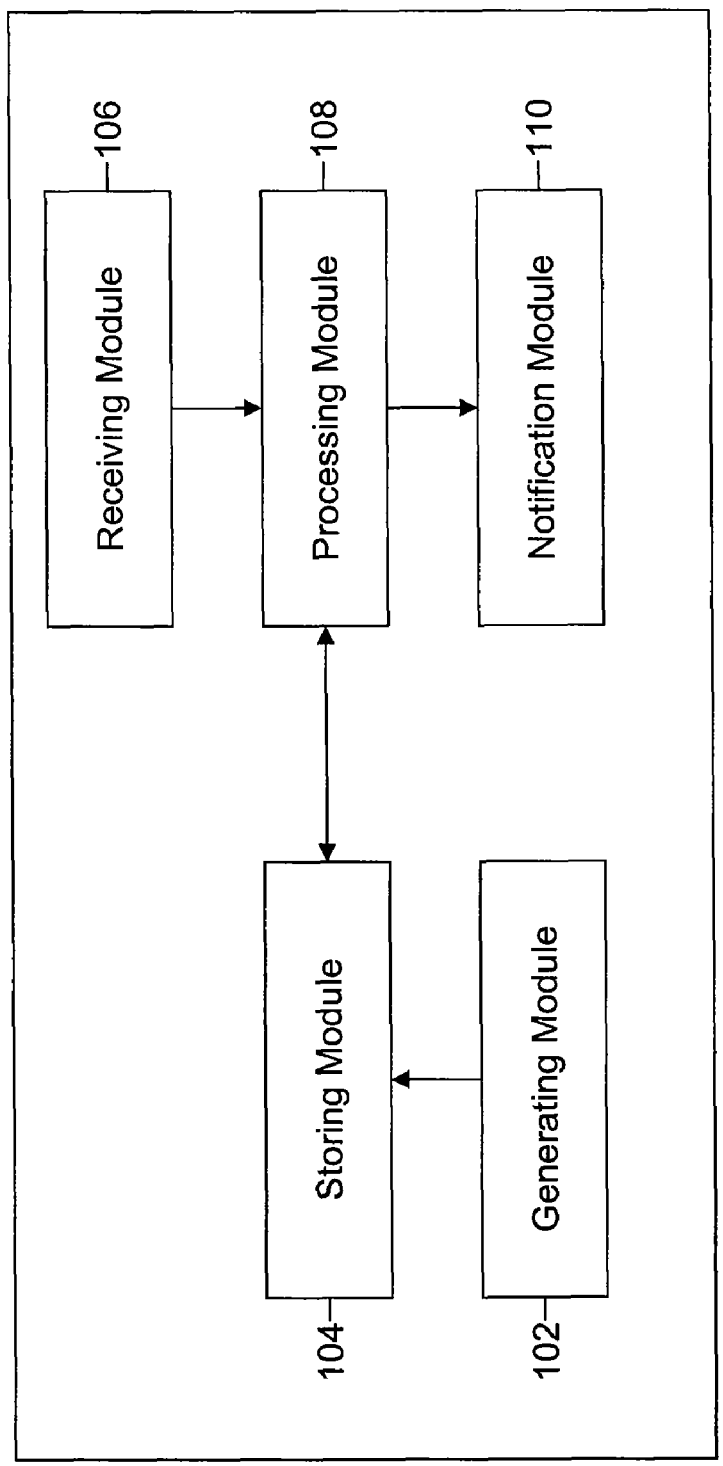
FIG. 1 is a block diagram of an exemplary architecture of a system, in accordance with an embodiment of the invention.

FIG. 1 is a block diagram of an exemplary architecture of an authorization system, in accordance with an embodiment of the invention. System 100 provides authorization of a financial transaction involving a purchase order based on the financial risk involved in the financial transaction. System 100 includes a generating module 102, a storing module 104, a receiving module 106, a processing module 108 and a notification module 110.

In an embodiment of the present invention, a predefined list of products may be defined by a risk assessment team of the financial institution. The predefined list of products includes details of products that are identified as high-risk products by the financial institution. In another embodiment of the invention, the predefined list of products may be defined by generating module 102 in accordance with policies defined by the risk assessment team. Generating module 102 may be embodied, for example, in the form of a software application.

In an alternative embodiment of the present invention, products on the predefined list are universally accepted as high-risk products by various financial institutions. Further, the predefined list of products may be defined based on several distinct factors including, but not limited to, transaction history, previous sales data, fraud analysis of previous cases, and the like. Theses factors do not limit the scope of the present invention and any method or a combination of several methods may be used to determine the predefined list of products. However, the predefined list of products, in an embodiment, is comprehensive covering all products that include high risk. The financial institution assigns a unique code to each product in the predefined list of products. The predefined list of products may further include a priority order for each product. The priority order is determined on the basis of the financial risk associated with the products. In an embodiment of the invention, the products may be listed in descending order of their priority in the predefined list of products. The predefined list of products may further include product type and make, and other details related to each product. The predefined list of products is maintained by the financial institution and is distributed to merchants for use while processing purchase orders. In an embodiment of the present invention, the predefined list of products may be distributed to various merchants in parts, depending on the category of the products they deal in. For example, an electronic goods store may not be given a part of the predefined list of products which includes apparels.

In various embodiments of the present invention, the financial institution may be a bank, a credit card issuer, and the like.

Storing module 104 is configured to store the predefined list of products. In an embodiment of the present invention, the predefined list of products is generated by generating module 102. In another embodiment of the present invention, the predefined list of products is manually formulated by the risk assessment team at the financial institution, and is stored in storing module 104.

In addition, storing module 104 may function as a repository in which transaction-related details of previous financial transactions are stored. These details may include account numbers of cardholders, history logs of financial transactions, consumer history, and the like.

Receiving module 106 is configured to receive product details of at least one product that is identified from the purchase order along with the authorization request. This product is identified by the merchant from the purchase order based on a comparison between the predefined list of products and the purchase order. The method for identifying the at least one product from the purchase order is described in detail in conjunction with FIG. 3. The at least one product is hereinafter referred to as identified product for convenience and not to limit the scope of the present invention. Furthermore, it must be noted that the identified product may include more than one product that is identified from the purchase order.

The product details include, for example, a unique code associated with the identified product and the quantity of the identified product, in accordance with the purchase order. The unique code for the product is determined from the predefined list of products, and the quantity of the identified product is determined from the purchase order. The unique code is identified from the predefined list of products on the basis of the type and make of the product, in accordance with the purchase order. The unique code may be included as a field in the electronic authorization request sent to the financial institution from the merchant.

The authorization request also contains other transaction-related details that include, but are not limited to, name of the cardholder, card number, and a merchant identification code. The authorization request may be received through any secure communication platform. For example, a landline phone with a display screen, a web phone with a display screen, a cellular phone, a PDA device, a personal computer, a handheld device, a point of sale (POS) device, and the like may be used to transmit the authorization request to the financial institution. Receiving module 106 is configured to receive the authorization request from all such communication devices. It must be understood that the mode of communication and transmission of the authorization request may vary without limiting the scope of the present invention.

In an embodiment of the present invention, receiving module 106 may also include one or more input and output devices, such as a keyboard, a keypad, a touch screen, a voice recognition system, a speaker, a display unit, and the like, to communicate with the merchant. It must be understood that receiving module 106 may be coupled with several networks, and it is configured to receive authorization requests from several merchants simultaneously. Similarly, more than one receiving module 106 may also be used and coupled together to receive the authorization requests from several merchants.

Processing module 108 is in communication with receiving module 106. Processing module 108 is configured to process the authorization request received by receiving module 106. The processing of the authorization request is performed on the basis of transaction-related details and the product details that are received by receiving module 106. The processing of the request also takes into account the predefined list of products which is stored in storing module 104. The method for the processing of the product details based on the predefined list of products is described in detail in conjunction with FIG. 3. In this manner, a risk assessment based on the identified product may be made in real time.

Processing module 108 may be implemented by utilizing several hardware and software components that perform processing of the authorization request. For example, embodiments of the present invention may employ various integrated circuits, such as memory elements, logic elements, processing elements, look-up tables, and the like, in processing module 108. Processing module 108 generates an output based on the processing of the authorization request.

Notification module 110 is configured to transmit a notification to the merchant regarding the output of processing module 108. The notification either approves or declines the authorization request based on the output.

The notification may be sent by notification module 110 by utilizing any wired or wireless communication platform as described above in conjunction with the description of receiving module 106. Similarly, any device as mentioned earlier may be utilized for sending the notification to the merchants. In an embodiment of the present invention, receiving module 106 and notification module 110 may be integrated and configured to receive the authorization request and to transmit the notification subsequently as well.

In accordance with various embodiments of the present invention, system 100 as described above may be implemented at the financial institution or partially at the merchant. Existing systems operating at the merchant do not require any additional software while seeking authorization of the financial transaction if system 100 is implemented at the financial institution.

III. Process

Figure 2:
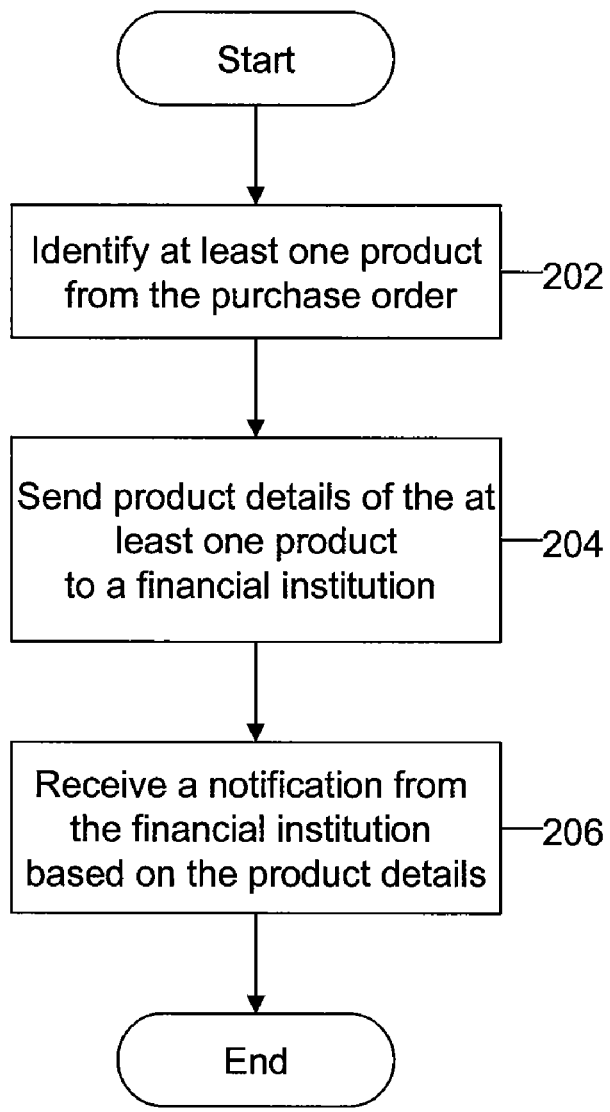
FIG. 2 is a flowchart illustrating a method for seeking authorization from a financial institution for a purchase order, in accordance with an embodiment of the invention.

FIG. 2 is a flowchart illustrating a method 200 for seeking authorization from a financial institution for a purchase order. At step 202, at least one product is identified from the purchase order by the merchant. At step 204, product details of the at least one product are sent, along with an authorization request, to the financial institution. At step 206, a notification is received by the merchant from the financial institution related to the authorization of the financial transaction based on the product details. The at least one product is hereinafter referred to as the identified product for convenience and not to limit the scope of the present invention. Further, it must be noted that more than one product may also be considered as identified products.

At step 202, at least one product is identified from the purchase order based on a predefined list of products. The predefined list of products includes the details of products that are identified as high-risk products by the financial institution. A unique code is assigned to each product in the predefined list of products by the financial institution. Further, the predefined list of products includes product type and make, and other details of each product. The predefined list of products is prepared by the financial institution and is distributed to merchants. In an alternative embodiment of the present invention, the predefined list of products may be distributed to merchants in parts, depending on the business domain that they operate in. The predefined list of products is further described in detail in conjunction with FIGS. 1 and 3.

The identified product is present in the predefined list of products and therefore, involves high risk. The method for identifying the product from the purchase order is further described in detail in conjunction with FIG. 3. After the product is identified from the purchase order, the merchant may determine the product details of the identified product. The product details include the unique code and the quantity of the product. The unique code of the product is determined from the predefined list of products, and the quantity of the product is determined from the purchase order. The unique code is identified from the predefined list of products on the basis of the type and make of the product, in accordance with the purchase order. Such a determination may be made electronically by an authorization request system of the merchant.

At step 204, product details of the identified product are sent to the financial institution along with an authorization request using, for example, an authorization request system of the merchant. The authorization request contains transaction-related details that include, but are not limited to, name of the cardholder, card number, and a merchant identification code. The merchant sends the product details of the identified product and the authorization request to the financial institution, seeking authorization of the financial transaction. The mode of sending the authorization request and the product details are described in detail in conjunction with FIG. 3. However, it must be understood that the mode of sending and receiving the authorization request does not limit the scope of the present invention. Thereafter, the financial institution processes the authorization request based on the transaction-related details, the product details, and the predefined list of products, allowing for a real-time risk assessment based on the identified product.

At step 206, a notification related to the authorization request is received by the merchant from the financial institution. The authorization request is processed by the financial institution on the basis of the transaction-related details and the details of the identified product. In one case, the authorization request for the financial transaction is approved by the financial institution. The merchant then completes the purchase order of the consumer and accordingly a credit amount is deducted from the account of the consumer or an account holder. In another case, the authorization request for the financial transaction is declined by the financial institution. The merchant then terminates the financial transaction without completing the purchase order.

In an embodiment of the present invention, the transaction-related details and the corresponding product details are stored in a database maintained by the financial institution. These details are later used by the financial institution for improving financial risk assessment processes for future transactions.

IV. Example Implementation

Figure 3:
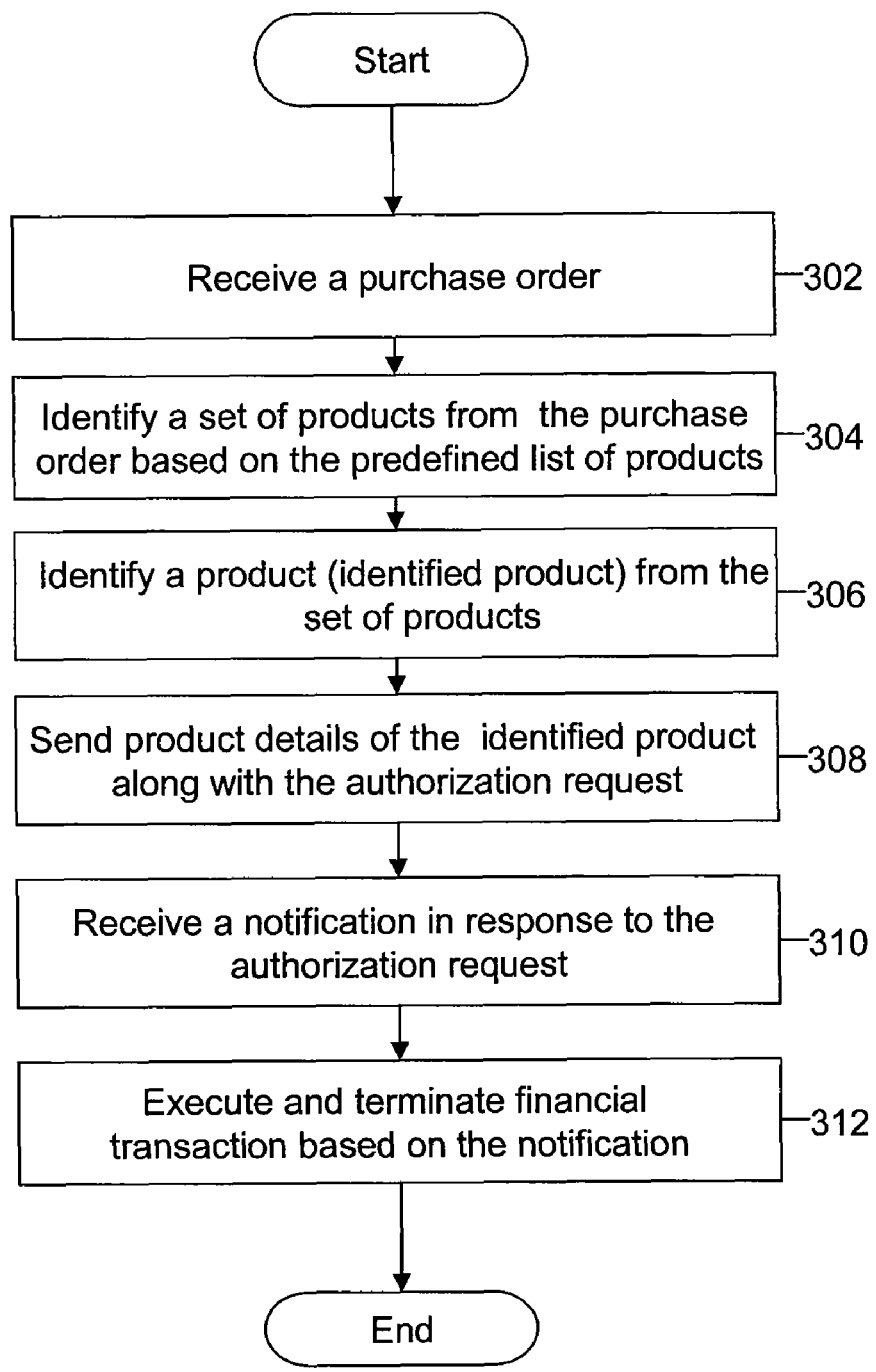
FIG. 3 is a flowchart illustrating a detailed implementation of an exemplary method for seeking authorization of a financial transaction for a purchase order, in accordance with an embodiment of the invention.

FIG. 3 is a flowchart illustrating a detailed implementation of an exemplary method 300 for seeking authorization of a financial transaction for a purchase order, according to an embodiment of the present invention. Method 300 may be implemented by utilizing system 100 and method 200 as described above in conjunction with FIGS. 1 and 2.

Method 300 begins at step 302, where a merchant receives a purchase order from a consumer. At step 304, the merchant identifies a set of products from the purchase order on the basis of a predefined list of products. At step 306, the merchant electronically identifies at least one product, referred to as the identified product, from the set of products. At step 308, the merchant sends product details of the identified product, along with the authorization request, to a financial institution. The product details are sent to the financial institution for seeking authorization of a financial transaction corresponding to the purchase order. At step 310, the merchant receives a notification in response to the authorization request. Method 300 ends at step 312, when the merchant completes the financial transaction on the basis of the received notification.

At step 302, the merchant receives a purchase order for the financial transaction. A purchase order may include one or more products requested by a consumer for purchase. The consumer may place the purchase order by using any of the known online or offline methods of financial transactions, such as with the help of the Internet, a telephone, a handheld device, a point of sale (POS) device, and the like. For example, the consumer may place the purchase order through an online checkout application or other card-not-present method. Further, the consumer may place a purchase order by handpicking various articles at a brick-and-mortar shopping mart or a retail store and presenting a transaction instrument for payment. These articles may be traced with the help of bar code readers or RFID tags, and converted into a purchase order for financial transaction. The method of placing a purchase order by any of the means or devices mentioned above does not limit the scope of the present invention. The merchant may assist its consumers with placing orders with any of the methods based on their requirements and convenience. The purchase order includes details such as name and make of the products, quantity of the products to be purchased, a merchant code associated with each type of the products, and the like. These details may be input by the merchant or the consumer by using an input device in the electronic mode of financial transaction.

At step 304, the merchant identifies a set of products from the purchase order based on a predefined list of products. The set of products may be determined automatically, for example through electronic comparison of a product identifier with the predefined list of products. The merchant identifies a set of products from the purchase order which have high-risk by using the predefined list of products created by the financial institution. In other words, the products that are common between the purchase order and the predefined list of products are identified. In an embodiment of the present invention, the set of products is identified based on a priority order as defined in the predefined list of products. For example, only those five products of the purchase order that have a higher priority order in the predefined list of products may be identified as the set of products. The priority order is a relative ranking of all the products in the predefined list of products. In an exemplary embodiment of the present invention, the priority order of a product refers to a numerical value assigned to the product which defines financial risk associated with the product relative to the other products in the predefined list of products. For example, some products (e.g., gift cards) may be more highly associated with fraudulent transactions than other products (e.g., laptop computers). The financial risk associated with a product may be directly proportional to the priority order. In other words, the products with higher financial risk may be given priority over other products for being included in the set of products and thereby in the authorization request.

An exemplary predefined list of products including unique codes and their respective priority orders is illustrated in FIG. 4. The unique codes and their respective priority orders are illustrated only for the purpose of description and various other formats of defining the unique codes and their respective priority orders may be used without limiting the scope of the present invention.

The set of products may be identified from the purchase order based on the priority orders associated with each product in the predefined list of products. In accordance with the exemplary illustration in FIG. 4, P1 has a priority order of 1, and it is considered to have the highest priority order. Therefore, the product P1 involves the maximum financial risk in the predefined list of products. In an alternative embodiment of the present invention, the notations of the product codes depends on the specification used by the financial institution and may also depict the priority order associated with the products. However, this should be considered only for the purpose of illustration, and does not limit the scope of the present invention. It must be understood that the merchant may employ any method known in the art to place a purchase order and to compare the purchase order with the predefined list of products to identify the set of products, and is not limited by the scope of the present invention. Further, the merchant may receive and store the predefined list of products in any manner suitable to the merchant and the financial institution, and is not limited by the scope of the invention.

At step 306, the merchant identifies a product, referred to as the identified product, from the set of products identified at step 304. The identified product is identified on the basis of the quantity of each product in the set of products as requested by the consumer in the purchase order. In an embodiment of the invention, the product with the maximum quantity in the set of products is identified as the identified product. If two or more products have the same maximum quantity in the set of products, the identification is made on the basis of the priority order, i.e., the product with higher priority order among the products with the same quantity is identified as the identified product. In another embodiment of the present invention, a product with the maximum cumulative value in terms of the total amount is identified as the identified product. It must, however, be understood that more than one product may be identified as the identified product.

In accordance with an alternative embodiment of the present invention, the identified product may be identified only on the basis of priority, without considering the quantity of the products as provided in the purchase order. In this case, the product with a higher priority in the predefined list of products is selected as the identified product.

In yet another embodiment of the present invention, the identified product may be directly identified from the purchase order, without identifying the set of products at step 304. In this case, the product with the highest quantity in the purchase order is selected, and thereafter, it is checked whether the product is present in the predefined list of products. If it is present in the predefined list of products, the product is identified as the identified product; else a product with the second highest quantity is selected from the purchase order and the process is repeated until a product is found in the predefined list of products. Such a check may be performed electronically, such as by the authorization request system of the merchant.

At step 308, the merchant sends the product details of the identified product to a financial institution as part of an authorization request. For example, the product details may be sent as a field in the authorization request string. The product details include the unique code associated with the product and the quantity of the product. The unique code is obtained from the predefined list of products and the quantity is obtained from the purchase order. The authorization request contains transaction-related details other than the product details that include, but are not limited to, name of the cardholder, card number, and a merchant identification code. The merchant sends the authorization request through any secure communication platform. For example, a landline phone with a display screen, a web phone with a display screen, a cellular phone, a PDA device, a personal computer, a handheld device, a point of sale (POS) device, and the like may be used to transmit the authorization request to the financial institution. It must be understood that the mode of communication and transmission of the authorization request may vary without limiting the scope of the present invention.

In an embodiment of the present invention, the authorization request includes a bit architecture in which several identifier fields meant to transmit information related to the products for financial transaction are created. A first byte of the bit architecture authorization request may be used to define the unique code of the identified product. The next three bytes of the authorization request may be used to define the quantity of the identified product. It must be understood that a four-byte architecture is explained only for the purpose of illustration and it should not limit the scope of the present invention.

The financial institution processes the authorization request based on the transaction-related details, the predefined list of products, and the product details. The financial institution assesses, in real time, the financial risk involved in the financial transaction of the purchase order based on the product details sent along with the authorization request. Such an assessment may be made, for example, on the basis of the risk associated with the identified product alone, or in conjunction with a risk associated with the consumer allegedly making the purchase.

At step 310, the merchant receives a notification in response to the authorization request. The notification related to the authorization request is based on the processing of the transaction-related details and the product details. In one case, the authorization request for the financial transaction is approved by the financial institution. In another case, the authorization request for the financial transaction is declined by the financial institution.

Finally, at step 312, the financial transaction is completed based on the notification received from the financial institution. The merchant completes the purchase order of the consumer if the financial transaction is approved by the financial institution, and a credit amount is deducted from the account of the consumer or an account holder. The merchant rejects the purchase order if the financial transaction is declined by the financial institution. Thereafter, the merchant terminates the financial transaction.

Figure 5:
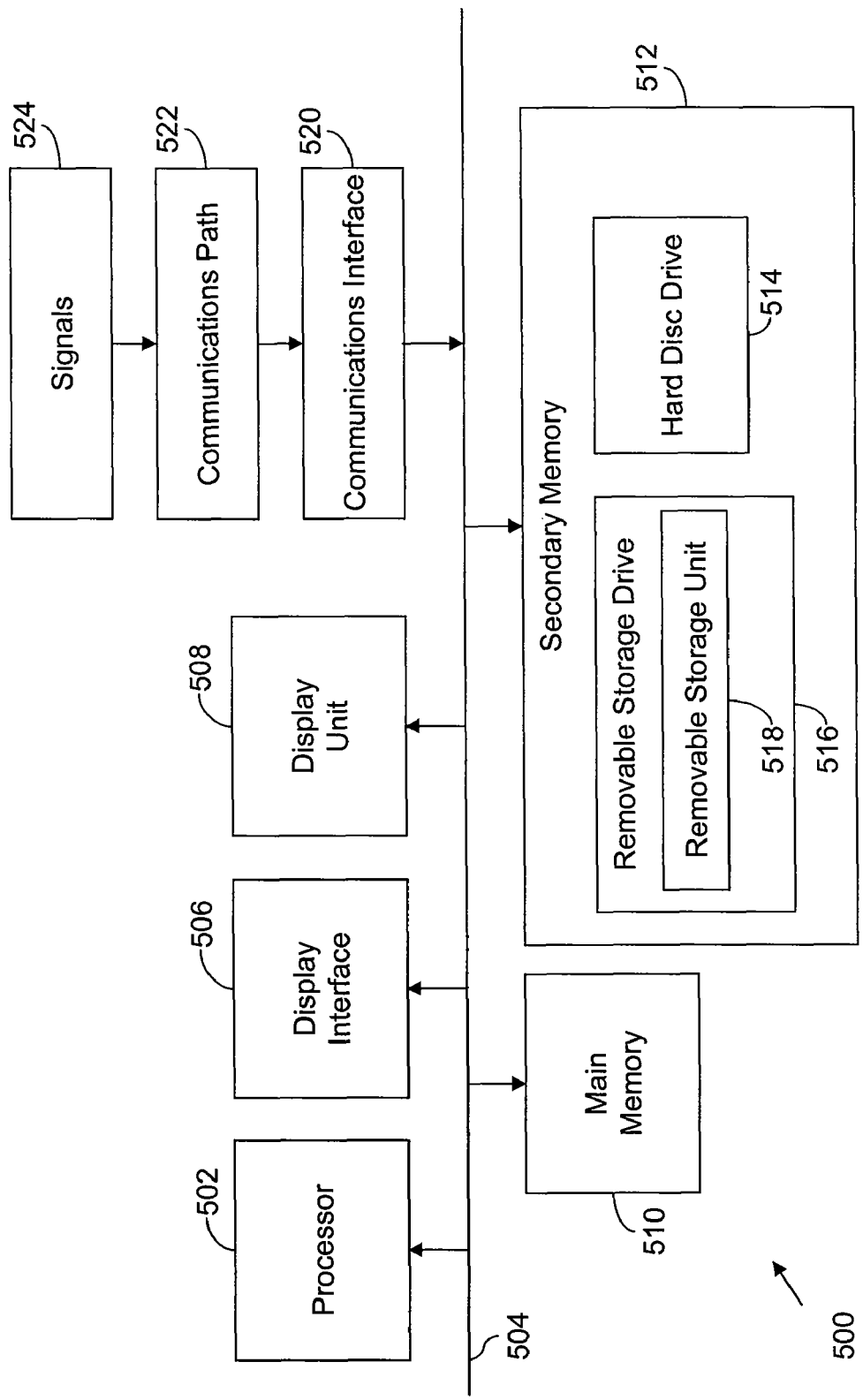
FIG. 5 is a block diagram of an exemplary computer system, in accordance with an embodiment of the invention.

Embodiments of the present invention, e.g., system 100, method 200, method 300 or any part(s) or function(s) thereof, may be implemented by using hardware, software or a combination thereof, and may be implemented in one or more computer systems or other processing systems. The manipulations performed are often referred to in terms, such as adding or comparing, which are commonly associated with the mental operations performed by a human operator. This capability of a human operator is unnecessary, or undesirable, in most cases, in any of the operations described herein, which form part of the present invention. On the contrary, the operations are machine operations. Useful machines for performing the operations include digital computers or similar devices. An example of a computer system 500 is shown in FIG. 5.

Computer system 500 includes one or more processors such as processor 502. Processor 502 is connected to a communication infrastructure 504, for example, a communication bus, a cross-over bar, and a network. Various software embodiments are described in terms of this exemplary computer system. After reading this description, it will become apparent to a person skilled in the relevant art(s) how the invention can be implemented by using other computer systems and/or architectures.

Computer system 500 may include a display interface 506 that forwards graphics, text, and other data received from communication infrastructure 504 (or from a frame buffer that is not shown) for display on a display unit 508.

Computer system 500 also includes a main memory 510, preferably a random access memory (RAM), and may also include a secondary memory 512. Secondary memory 512 may include, for example, a hard disk drive 514 and/or a removable storage drive 516 representing a floppy disk drive, a magnetic tape drive, an optical disk drive, etc. Removable storage drive 516 reads from and/or writes to a removable storage unit 518 in a well-known manner. Removable storage unit 518 represents a floppy disk, a magnetic tape, an optical disk, etc., which is read by and written to by removable storage drive 516. As will be appreciated, removable storage unit 518 includes a computer-readable storage medium with stored computer software and/or data.

In alternative embodiments, secondary memory 512 may include other similar devices, enabling computer programs or other instructions to be loaded into computer system 500. Such devices may include, for example, a removable storage unit and an interface. Examples of these devices may include a program cartridge and a cartridge interface such as those found in video game devices, a removable memory chip such as an erasable programmable read-only memory (EPROM), or a programmable read only memory (PROM)) and an associated socket, as well as other removable storage units and interfaces that enable software and data to be transferred from the removable storage unit to computer system 500.

Computer system 500 may also include a communications interface 520, which enables software and data to be transferred between computer system 500 and external devices. Examples of communications interface 520 may include a modem, a network interface such as an Ethernet card, a communications port, a Personal Computer Memory Card International Association (PCMCIA) slot, and card. Software and data transferred via communications interface 520 may be in the form of signals 524, which may be electronic, electromagnetic, optical or other signals that are capable of being received by communications interface 520. These signals 524 are provided to communications interface 520 via a communications path 522 (e.g., channel). This communications path 522 carries signals 524 and may be implemented by using a wire or cable, fiber optics, a telephone line, a cellular link, a radio frequency (RF) link, and other communication channels.

In this document, the terms 'computer program medium' and 'computer-readable medium' are used to generally refer to media such as removable storage drive 516, a hard disk installed in hard disk drive 514, and signals 524. These computer program products provide software to computer system 500. Embodiments of the invention are directed at such computer program products.

Computer programs, also referred to as computer control logic, are stored in main memory 510 and/or secondary memory 512. These computer programs may also be received via communications interface 520. Such computer programs, when executed, enable computer system 500 to perform the features of the present invention, as discussed herein. In particular, the computer programs, when executed, enable processor 502 to perform the features of the present invention. Accordingly, such computer programs act as the controllers of computer system 500.

In an embodiment where the invention is implemented by using software, the software may be stored in a computer program product and loaded into computer system 500 by using removable storage drive 516, hard disk drive 514 or communications interface 520. The control logic (software), when executed by processor 502, causes processor 502 to perform the functions of the invention, as described herein.

In another embodiment, the invention is implemented primarily in hardware, using, for example, hardware components such as application-specific integrated circuits (ASICs). The implementation of the hardware state machine, to perform the functions described herein, will be apparent to persons skilled in the relevant art(s).

In yet another embodiment, the invention is implemented by using a combination of both hardware and software.

V. Conclusion

While various embodiments of the present invention have been described above, it should be understood that they have been presented by way of example and not limitation. It will be apparent to persons skilled in the relevant art(s) that various changes in form and detail can be made therein, without departing from the spirit and scope of the present invention. Therefore, the present invention should not be limited by any of the exemplary embodiments described above, but should be defined only in accordance with the following claims and their equivalents.

In addition, it should be understood that the figures illustrated in the attachments, which highlight the functionality and advantages of the present invention, are presented for exemplary purposes only. The architecture of the present invention is sufficiently flexible and configurable, such that it may be utilized (and navigated) in ways other than that shown in the accompanying figures.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method comprising:
receiving, by a computer-based merchant system for evaluating financial risk and from a financial institution, a predefined list of products, wherein each of a plurality of products in the predefined list of products is ranked from a product associated with a greatest financial risk to a product associated with a least financial risk;
identifying, by the computer-based merchant system and from a plurality of product orders, a product order associated with a greatest financial risk by comparing the plurality of product orders to the predefined list of products;
transmitting, by the computer-based merchant system and from the plurality of product orders, an authorization request only for the product order associated with the greatest financial risk to the financial institution, wherein the product order includes at least one of: a unique product code and a quantity; and
receiving, by the computer-based merchant system, an authorization decision from the financial institution that is based on an assessment of financial risk associated with the product order.

2. The method of claim 1, further comprising assigning, by the computer-based system, a plurality of priority orders to a plurality of product orders.

3. The method of claim 2, wherein the plurality of priority orders are included in the predefined list of products.

4. The method of claim 2, wherein the plurality of priority orders rank the plurality of product orders from greatest financial risk to least financial risk.

5. The method of claim 1, wherein the product order associated with the greatest financial risk is the product order associated with a greatest quantity of products.

6. The method of claim 1, further comprising transmitting, by the computer-based system and to the financial institution, an authorization request for the product order associated with a greatest priority order and an authorization request for the product order associated with a greatest quantity of products.

7. The method of claim 1, wherein the predefined list of products is defined by the financial institution and associated with a list of products having a financial risk.

8. The method of claim 1, wherein the unique product code is defined by the financial institution and included in the predefined list of products.

9. An article of manufacture that, in response to execution by a computer-based merchant system for evaluating financial risk, cause the computer-based merchant system to perform operations comprising:
receiving, by the computer-based merchant system and from a financial institution, a predefined list of products, wherein each of a plurality of products in the predefined list of products is ranked from a product associated with a greatest financial risk to a product associated with a least financial risk;
identifying, by the computer-based merchant system and from a plurality of product orders, a product order associated with a greatest financial risk by comparing the plurality of product orders to the predefined list of products;
transmitting, by the computer-based merchant system and from the plurality of product orders, an authorization request only for the product order associated with the greatest financial risk to the financial institution, wherein the product order includes at least one of: a unique product code and a quantity; and
receiving, by the computer-based merchant system, an authorization decision from the financial institution that is based on an assessment of financial risk associated with the product order.

10. The article of claim 9, further comprising assigning, by the computer-based system, a plurality of priority orders to a plurality of product orders.

11. The article of claim 10, wherein the plurality of priority orders are included in the predefined list of products.

12. The article of claim 10, wherein the plurality of priority orders rank the plurality of product orders from greatest financial risk to least financial risk.

13. The article of claim 9, wherein the product order associated with the greatest financial risk is the product order associated with a greatest quantity of products.

14. A system comprising:
a tangible, non-transitory memory communicating with a merchant processor for evaluating financial risk,
the tangible, non-transitory memory having instructions stored thereon that, in response to execution by the merchant processor, cause the merchant processor to perform operations comprising:

receiving, by the merchant processor and from a financial institution, a predefined list of products, wherein each of a plurality of products in the predefined list of products is ranked from a product associated with a greatest financial risk to a product associated with a least financial risk;

identifying, by merchant processor, and from a plurality of product orders, a product order associated with a greatest financial risk by comparing the plurality of product orders to the predefined list of products;

transmitting, by the merchant processor and from the plurality of product orders, an authorization request only for the product order associated with the greatest financial risk to the financial institution, wherein the product order includes at least one of: a unique product code and a quantity; and receiving, by the merchant processor, an authorization decision from the financial institution that is based on an assessment of financial risk associated with the product order.

* * * * *